United States Patent
Terry

(10) Patent No.: US 7,049,954 B2
(45) Date of Patent: May 23, 2006

(54) DATA TRANSMISSION SYSTEM

(75) Inventor: Alan J. Terry, London (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 1036 days.

(21) Appl. No.: 09/944,306

(22) Filed: Aug. 31, 2001

(65) Prior Publication Data

US 2002/0103447 A1 Aug. 1, 2002

(30) Foreign Application Priority Data

Sep. 12, 2000 (GB) ................................. 0022269.5

(51) Int. Cl.
*G08B 1/08* (2006.01)

(52) U.S. Cl. ...................... 340/539.1; 455/39; 455/91; 455/231; 455/334; 455/343.1; 455/344; 340/573.1; 340/539.11; 340/669; 340/686.1; 340/825.64; 375/145; 375/149

(58) Field of Classification Search ...................... None
See application file for complete search history.

(56) References Cited

U.S. PATENT DOCUMENTS

| | | | | |
|---|---|---|---|---|
| 4,697,263 A | | 9/1987 | Beaufoy ........................ 370/85 |
| 5,168,506 A | | 12/1992 | Erbes et al. .................... 375/1 |
| 5,321,754 A | * | 6/1994 | Fisher et al. ................ 380/268 |
| 5,426,425 A | * | 6/1995 | Conrad et al. ......... 340/825.49 |
| 5,481,259 A | | 1/1996 | Bane ..................... 340/870.03 |
| 5,683,432 A | * | 11/1997 | Goedeke et al. .............. 607/32 |
| 5,724,265 A | * | 3/1998 | Hutchings ................... 702/141 |
| 5,752,201 A | | 5/1998 | Kivari ......................... 455/574 |
| 5,959,984 A | | 9/1999 | Dent .......................... 370/347 |
| 6,363,101 B1 | * | 3/2002 | Sudo et al. .................. 375/147 |
| 6,667,993 B1 | * | 12/2003 | Lippett et al. .............. 370/509 |
| 2001/0041594 A1 | * | 11/2001 | Arazi et al. ................. 455/561 |

FOREIGN PATENT DOCUMENTS

| | | |
|---|---|---|
| EP | 0529269 A2 | 3/1993 |
| EP | 0593289 A2 | 4/1994 |
| WO | WO9110471 | 7/1991 |

* cited by examiner

Primary Examiner—Benjamin C. Lee

(57) ABSTRACT

A data transmission system for short but frequent data pulses comprises a transmitter (10) and a receiver (12). The transmitter comprises a pseudo-random signal generator (16) which governs the time delay between successive timing points and a local oscillator (15) which controls the time of data transmission, and the receiver comprises a corresponding pseudo-random signal generator (22) and local oscillator (24). Power is applied to the receiver substantially only corresponding in time to the timing of the data bursts. Multiple collisions between adjacent systems operating on the same wavelength are avoided and the receiver is controlled to consume power only around the timing of the data bursts.

20 Claims, 3 Drawing Sheets

FIG.2

| RUN-IN | FRAMING | DATABLOCK 1 | DATABLOCK 2 | DATABLOCK 3 | FLAG A | FLAG B | FLAG C |
|---|---|---|---|---|---|---|---|

FIG.3A

| | Nibble 1 | Nibble 2 | Nibble 3 | Flag A |
|---|---|---|---|---|
| Message 1 | FSR 3-0 XOR Address 3-0 | Fn ; FSR 5-4 | Address 3-0 | M = 1 |
| Message 2 | Address 7-4 | **Distance 7-4 | **Distance 3-0 | |
| Message 3 | Address 11-8 | **Distance 15-12 | **Distance 11-8 | (V low) |
| Message 4 | Address 15-12 | Spare | Volts / Spare | |

|  | Nibble 1 | Nibble 2 | Nibble 3 | Flag A |
|---|---|---|---|---|
| Message 1 a | FSR 3-0 XOR Address 3-0 | Speed 7-4 | Speed 3-0 | M = 0 |
| Message 2 a | Fn =01 ;FSR 5-4 (message 1a) | Speed 7-4 | Speed 3-0 | (R/W) |
| Message 3 a | Address 7-4 | Speed 7-4 | Speed 3-0 | (V low) |
| Message 4 a | **Distance 7-4 | Speed 7-4 | Speed 3-0 |  |
| Message 1 b | FSR 3-0 XOR Address 3-0 | Speed 7-4 | Speed 3-0 | M = 0 |
| Message 2 b | Fn =10 ;FSR 5-4 (message 1b) | Speed 7-4 | Speed 3-0 | (R/W) |
| Message 3 b | Address 11-8 | Speed 7-4 | Speed 3-0 | (V low) |
| Message 4 b | **Distance 11-8 | Speed 7-4 | Speed 3-0 |  |
| Message 1 c | FSR 3-0 XOR Address 3-0 | Speed 7-4 | Speed 3-0 | M = 0 |
| Message 2 c | Fn =11 ;FSR 5-4 (message 1c) | Speed 7-4 | Speed 3-0 | (R/W) |
| Message 3 c | Address 15-12 | Speed 7-4 | Speed 3-0 | (V low) |
| Message 4 c | **Distance 15-12 | Speed 7-4 | Speed 3-0 |  |

FIG. 3B

DATA TRANSMISSION SYSTEM

This invention relates to data transmission systems, and in particular to a data transmission system in which short but frequent data pulses are to be transmitted with minimum power consumption. The invention also relates particularly to a system which may be used in close proximity to other identical systems.

There are various applications in which short data bursts are to be transmitted, for example to provide a continuous monitoring function of a sensor signal to a remote receiver. Where there may be many such systems operating in close proximity, there is also a need to prevent collision between the systems. This may be achieved using different transmission frequencies, but this is bandwidth inefficient and increases the cost and power consumption of the system.

Examples of systems having these requirements include heart rate monitor systems, in which a heart rate signal is transmitted from a sensor to a receiving device. A further example is in body monitoring sensors for exercise equipment, for example running or cycling shoes, where a speed signal sensed at a user's foot (using an accelerometer) is transmitted to a receiving device held in the user's hand or worn on the user's wrist. In this latter case, there may be many such systems in close proximity, for example in a gym or on an athletics track, cycling course or marathon route.

There is therefore a need for a low cost system with low power consumption and yet which provides protection against signal collision.

According to the invention, there is provided a data transmission system, comprising a transmitter and a receiver, wherein the transmitter is arranged to send data bursts with a duty cycle of less than 5% at transmission timing points, the transmitter comprising a pseudo-random signal generator which governs the time delay between successive timing points and a local oscillator which controls the time of data transmission, and wherein the receiver comprises a corresponding pseudo-random signal generator and local oscillator, and wherein power is applied to the receiver substantially only corresponding in time to the timing of the data bursts.

The invention provides pseudo-random timing of data bursts to prevent multiple collisions between adjacent systems operating on the same wavelength. This avoids the need to implement a complicated multiplexing system. The receiver is controlled to consume power only at (and just before) the timing of the data bursts. The pseudo-random sequence is predictable, so that the receiver can determine when future data bursts will arrive.

Preferably, the transmitter is arranged to send data bursts with a duty cycle of less than 1%.

The transmitter and receiver each include a power source which may comprise a non-rechargeable battery. This is made possible by the power efficiency of the system.

Each data burst may comprise a header section and a data section, and the header section for a sub-set of the data bursts comprises a sequence which is unique to the header, thereby to enable the receiver to obtain bit timing information. The header section for a sub-set of the data bursts may also comprise data defining the time period to the next message. This enables the pseudo-random sequence generators to be synchronised.

The transmitter may be for attachment to a shoe, and then comprises an accelerometer and a processing unit, the processing unit integrating the detected acceleration over time to obtain instantaneous speed values which are transmitted in the data bursts. The receiver may be for wearing on the wrist of the user of the system. This enables a speed monitoring system to be implemented for joggers or cyclists.

Each local oscillator preferably comprises a 32768 Hz quartz oscillator, which is available as a low cost wrist watch component.

Examples of the invention will now be described in detail with reference to the accompanying drawings, in which:

FIG. 2 shows generally the message structure used in the transmission system of the invention;

FIG. 3A shows a specific "static" message structure used in the transmission system of the invention;

FIG. 3B shows a specific "moving" message structure used in the transmission system of the invention.

Figure 1:
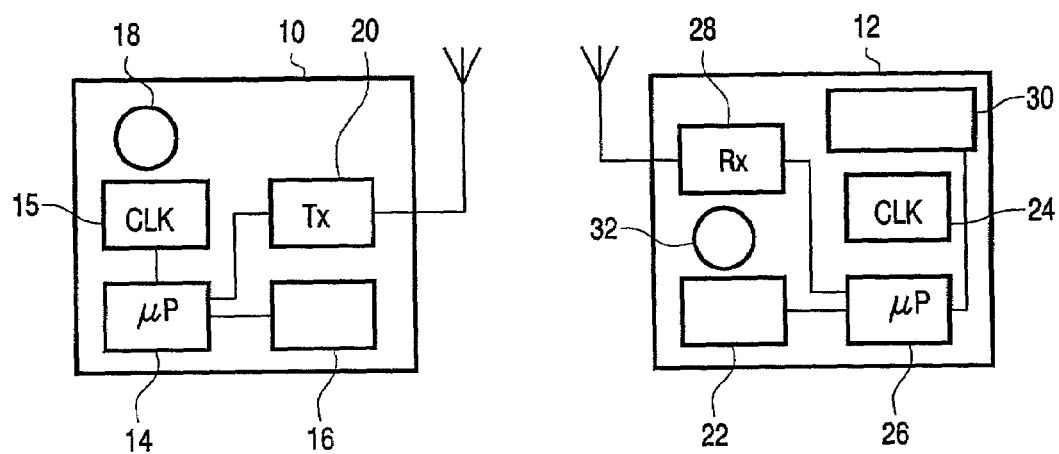
FIG. 1 shows a data transmission system of the invention.

FIG. 1 shows a data transmission system of the invention. The system comprises a transmitter 10 and a receiver 12. The transmitter 10 comprises a processor 14 which receives signals from a clock 15 in the form of a quartz watch oscillator at 32768 Hz and a pseudo random sequence generator 16 (which may be part of the processor 14) in the form of a maximal length feedback shift register. The transmitter also comprises a non-rechargeable battery 18, and a radio frequency transmitter unit 20. The pseudo-random generator 16 governs the time delay between successive transmission instants and the local oscillator 15 provides a bit clock signal.

The receiver 12 comprises a corresponding pseudo-random signal generator 22 and local oscillator 24, a processor 26, a receiving unit 28 and a display 30. The receiver also comprises a non-rechargeable battery 32.

The operation of the system will be described below in greater detail with reference to a particular use of the system in a running or walking shoe/boot having a transmitter for sending speed and/or distance data to a wrist mounted receiver. This system enables a runner to pace their speed during long distance events. In this system, frequent speed updates are required to the user, with accurate distance calculation, even if some speed signals fail to be successfully received. The system needs to operate with other users in the vicinity, and needs to be low cost, with good non-rechargeable battery life.

To achieve these aims, short duration messages are sent with the radio active for the shortest possible time, by determining in the receiver a known time of arrival of incoming messages. To reduce collision between systems, operating on the same transmission frequency, different systems send data at different time intervals.

The communication between the transmitter and receiver starts with a one-off enrolment "installation" operation. This sets up a transmitter ID which is informed to the receiver, or else the receiver is informed of a pre-set transmitter ID.

During a session, the receiver acquires the transmitter ID and sychronises the pseudo-random sequence generator. During the session, short messages are sent, for example 10 ms, approximately every 1 s. The message comprises speed data determined by an accelerometer, and converted into instantaneous speed by the processor. The sequence enables the receiver to stay in time with the transmitter even if some messages are lost.

The "Messages" are transmitted approximately once per second at a bit rate of 2730 bits per second, i.e. each bit has a duration equal to 12 cycles of the reference 32 kHz watch crystal. A typical microcontroller divides its reference clock input rate by 4 to give each instruction cycle. In this case, each bit has a duration of 3 instruction-cycles, which is the minimum that it is practical to use to transmit or receive data using embedded program code if the microcontroller is clocked by a watch crystal.

The method of transmission may use simple "On-Off Keying" (OOK) Amplitude Modulation using the RF carrier to represent binary '1' and the absence of carrier to represent '0'.

The messages are structured as shown in FIG. 2, where only the sections bounded by bold lines are present in all messages.

The (long) RUN-IN consists of a string of binary '1's and is present only in every $4^{th}$ message to reduce the average transmission time, thus freeing time for more Shoes to operate. The long Run-in helps to identify the Framing Pattern and marks the messages that contain the Timing Data (variable time delay to the next message). The sequence of consecutive 1's in the Run-in and Framing Pattern combined is longer than occurs within the normal data, so that this Run-in defines a unique pattern. Therefore, if the position of the Framing Pulse is not accurately known (to within about one bit-period), then it can be identified in every $4^{th}$ message because it immediately follows the long run-in. The three intervening messages have just a short run-in (typically 2 bits), contained within the Framing Pattern. The length of the long run-in is determined by entering a counting loop each time a 1 is detected, the counting ending when a 0 is next detected. Alternatively, a block of linear code may be followed, and the progression through the code before detection of a 0 is used to indicate the length of the run-in.

The FRAMING Pattern is used to prepare and synchronise the receiving logic (within the Wrist Unit microcontroller), ready to accept subsequent message data. When combined with the long run-in, it forms an easily recognisable unique pattern of bits.

Each DATABLOCK contains a nibble (4 bits) of data but this is expanded to 6 bits for error-detection, to reduce the maximum number of consecutive identical bits, and to balance the number of 0's and 1's. It is desirable to limit the number of consecutive identical bits for several reasons, for example to assist the data slicing in the RF receiver circuits. However, as the limit for the number of repeated bits is set shorter, more "redundant" bits must be added, and this limits the amount of data that can be carried, with a given data rate and transmission time.

As one example, two bits may be added to each nibble of 4 bits, which can limit the longest "run" to 4 bits. This also gives some level of data "error trapping" because certain patterns of data bits are not valid.

A balanced number of 0's and 1's, can assist the "data slicing" process. Additionally, if every coded block has the same number of 1's, then a single bit-error can only produce a non-valid code and the error can be detected. This has characteristics similar to the previous process of limiting the length of "runs", and the coding scheme can be chosen to achieve suitable performance for both characteristics.

There are twenty 6-bit patterns that contain three 1's and three 0's, and only 16 are required to encode all possible data-nibbles. The longest run of the same bit within a code must be 3, but when two codes are transmitted consecutively a longer run can occur across their junction. Two of the patterns start (and end) with three identical bits, so by eliminating these, the occurrence of runs of 6 or 5 identical bits is avoided. It is not possible to totally eliminate the possibility of runs of 4 occurring, but two patterns begin and end with runs of two identical bits, so by eliminating these, the occurrence of runs of four identical bits is reduced.

The selected 16 bit patterns can be encoded using a 16-entry lookup table. There are various ways to decode the 6-bit words in the receiver, one of which is simply the use of a further lookup table. However, depending upon the coding scheme used, decoding may be possible using logic elements.

After the three datablocks are three optional (unprotected) FLAG Bits that can be used for additional control or data transport.

The binary bit sequences of the messages are transmitted in sequence from 'High' bit first to 'Low' bit last. The least significant bits are thus transmitted last, where there may be a higher risk of data errors occurring (e.g. a partial "collision" with a message from another transmitter).

The messages in the datablocks contain "Speed" and "Distance" data, but these are not absolute values, because they do not include calibration to the user, which can be performed in the Wrist Unit (the receiver), where the user is able to input the required correction factor much more conveniently. There may be a single accelerometer provided in the shoe, and the calibration is to take account of different gaits of different users. It may also be necessary to use more than one accelerometer.

When the Shoe is being used, the "Speed" data consists of typically 8 bits and must be transmitted in every message (i.e. at least once per second). However the total "system housekeeping" requires many more than 8 bits, and it would not make efficient use of the available radio and processing bandwidth to transmit all this data in every message. The housekeeping data is generally changing at a slow rate, if at all, or is repetitious, so it can be spread serially across a number of consecutive messages, to form a "group" of messages. Therefore, the messages are arranged in groups of four, with different housekeeping data contained in each message. The first message in each group can be identified by the long run-in of consecutive binary 1's.

Even spread over four messages, the necessary housekeeping data would still exceed the number of bits used for the "real" data payload of speed data in each message, so the housekeeping is further divided over a number of these groups of 4 messages, for example over 3 or 4 such groups, to give a total "frame" of 12 or 16 messages.

When the Shoe and Wrist Unit are switched on at the start of each session, it is necessary to transfer all the housekeeping data before the Wrist Unit display can be fully operational and correct. However, immediately after "switch on" there is no "speed" data to be transmitted. Therefore, at this time the housekeeping data can replace the Speed data in all the messages and thus can be accommodated in a single group of four messages in order to reduce the acquisition time.

There are thus two different types of message format, one for the normal "Moving" mode of the shoe, and the other "Static" mode which is optimised to help the Wrist Unit rapidly "Acquire" the correct Shoe transmissions and all the current data/status information. Furthermore, as described below, this timing may depend on the shoe ID, so it is important for "Enrolment" (the first time that a wrist unit is associated with particular shoe) that the transmission of FSR and the necessary ID can be achieved in a single message.

In normal operation, when there is speed data to transmit, two nibbles carry the speed information, and one nibble handles the "housekeeping", spread over the total frame of 12 (or 16) consecutive messages. When there is no speed data, during the "Acquisition" stage before running or walking commences, or after the activity has ceased, then all three nibbles can transfer housekeeping data, which can be completed in a sequence of four consecutive messages. The structure of these messages is shown in FIG. 3.

FIG. 3A shows the "static" message structure. In this case, the first message (which can be identified because it follows the long "run-in") includes the 6 bits of the FSR code as well as the four address bits of the shoe, which are used to update the FSR sequence (as described below). It also contains the flag to indicate that it is a static message (M=1). The information in the first message thereby enables the subsequent message timing to be determined, and also the four bits of the address data help identify to a certain degree that the correct shoe is being received. The subsequent messages contain the remainder of the shoe address, distance data and miscellaneous data. In FIG. 3A, Fn is a two-bit marker of the Frame type or number (for example the message number 1 to 3 within the larger frame), M is a flag to indicate a static or moving message type, FSR m–n are bits m to n from Feedback Shift Register, Address m–n are bits m to n from the shoe address and Distance m–n are bits m to n from an accumulated distance register. The distance data may be updated only once every 12-message frame. V low is an optional Low Battery Voltage Flag.

FIG. 3B shows the "moving" message structure. In this case, the 8 bit speed data for each message is contained in the second and third nibbles, and the first nibble is used only for the address, FSR data and distance calculations. Additional miscellaneous bits shown include RAN for identifying whether the user is running or walking, and Volts 3–0 can indicate the shoe battery voltage. There is, of course, other diagnostic function data which can be transmitted.

Assuming the above parameters with 4-bits each for the extended Run-in and Framing, and one Auxiliary flag, then the longest message (with Flag A active) is 27 bits, with 3 subsequent messages of 23 bits. Thus the average message length is 24 bits, which has a duration of about 8.8 milliseconds. With both the Auxiliary Flags set to '1', the average message duration is about 9.15 ms.

Because of the very limited power resource (battery) available in the Wrist Unit, it is important that the RF receiver is operated for the shortest possible time. Therefore, the Wrist Unit controller needs to be able to predict when subsequent messages will be sent, once a valid message has been received. Thus, both the Shoe and Wrist Unit contain accurate time references ("Watch Crystals") so that timing errors only accumulate very slowly. This is particularly relevant because all messages do not contain a "unique" data-framing pattern, so this must be "found" within a defined window for the intermediate messages. Also, each message does not contain full Address data, so the main validation that each individual message is from the required shoe is that the message is located in the expected "timeslot".

The target update rate for information displayed on the Wrist Unit is once per second, so messages are transmitted with an average spacing slightly less than this. A higher repetition rate is of course desirable but for a given data rate and message length (duration) this would be at the expense of limiting the number of users who could share the available radio band (by creating an unacceptable number of message collisions).

As mentioned above, a variable "random" delay of between 750 milliseconds and one second is employed between messages, because if the message spacing is set at a constant fixed time, then if the messages from two shoes collide, subsequent messages will also collide. The spacing between transmissions is restricted to 16 possible precise values (which can be defined by 4 bits of data) and this data value is carried in all the "Long Run-in" messages that are used for the initial "Acquisition" of the data stream. However, this in itself would not be sufficient because all messages would have to carry time delay data. Also, a single "lost" message would "break the chain" so the Wrist Unit would not know when to switch on the RF receiver for subsequent messages. Thus, the sequence of time delays between messages is not truly random, but "pseudo random", and both the Shoe and the Wrist Unit can use the same method to calculate subsequent delays.

The "pseudo-random" time delay is calculated from a "Maximal Length Feedback Shift Register", which can be easily implemented by software within the microcontroller. Each subsequent state is logically calculated from the previous one, so as soon as the two FSR counting 'words' are synchronised in the Shoe and Wrist Unit, then they can remain locked together for all subsequent counting states. Furthermore, once the FSRs are locked together, the receiver logic can use the data values as an additional "Address check" to verify whether each particular message is being transmitted by the correct Shoe.

Maximal Length Feedback Shift Registers (ML-FSR) can be devised of any length, although some (for example 8 bits in length) need relatively complex logical operations. A simple implementation is to feed back the "Exclusive-OR" of just the last two bits of the FSR at each shift. This does not give Maximal-Length sequences with all lengths of FSR, but the following lengths are practical: 2, 3, 4, 6, 7, 15, and 22.

Before the "Acquisition" process can be completed (which prepares the receiver to receive from the transmitter) the state of all the bits in the FSR must be transferred as part of the "housekeeping" data. If a large number of bits are employed then either the Acquisition may take a long time, or each message will need to carry an excessive amount of "unproductive" data. A length of 6 bits has been selected for this particular application, although this produces a rather short "random" sequence. Additional techniques can, however, be employed to prevent any two shoes operating synchronously with the same sequence of "random" codes.

One possibility is to XOR the 4 bits taken from the FSR for each message with the Least Significant Bits of the Shoe's Address before being used to define the message delay. Therefore, in terms of the sequence of bits transmitted in the messages, instead of all shoes generating the same sequence of 63 bits (for a 6 bit FSR), there are 16 different sequences (i.e. a total of 1008 bits) depending on the address nibble of the shoe. Thus the effective length of the FSR can be considered as nearly 10 bits. Thus, four bits of the shoe address as well as the FSR code need to be transmitted for the receiver to be able to calculate the timing of the next message. This explains the need for the FSR code and the four bits of address data in the first message of FIG. 3A.

A second possible technique is to modify the message delay value (e.g. by "XOR-ing" with another nibble of the Address) once in each full frame of 12 (or 16) messages. This again modifies the timing sequence of the messages and helps to avoid situations when the transmissions from two Shoes are locked together for a long period of time.

Each "frame" of 4 messages carries 8 "housekeeping" bits to identify the frame number and the time delay between messages. In the "static" message format, all 8 bits are carried in the first message of the frame, but in the "moving" format, only four housekeeping bit positions are available, and these must indicate the delay time to the next message. The remaining four bits are transmitted in the second frame, but these are the same data bits as used in the static format, carried over from the first frame.

The delay between consecutive Framing Pulse Active Edges is given by the lower 4 bits of the contents of a Feedback Shift Register, added to a minimum value of exactly ¾ second (750 ms). The incremental value of the FSR bits is 1/64 second (15.625 ms) and thus the maximum delay between messages is 63/64 second.

With the "static" message format, the first frame (identified by the "long" run-in) contains all 6 FSR bits, so the receiver software can calculate the message delays to all subsequent messages (even if some are not received), until the address fields confirm or reject the suitability of the messages. With the "moving" message format, the receiver must detect the message immediately following the first to give the 6 FSR bits which only then can it rotate (leftwards by 4 bits) to give the delay time to the subsequent messages. The timing of the second message relative to the first must be given by code in the first message, as it is not yet derivable from the full FSR code which has not all been received from the first message in the "moving" message format. In the specific example described herein, the time delay to the second message is derivable from bits 0–3 of the Shoe Address and from bits 0–3 of the FSR data (which rotates), and this data all appears in the first message, as is apparent from FIG. 3B. When the second message has been received, all the FSR contents are known and the software can catch up on the FSR rotation. If the second message is lost, the time delay to the third and subsequent messages can not be determined, so the software must look for another long run-in.

The other two bits of the timing data may be used to indicate a frame number.

The transmissions from each transmitter use approximately 1% of the available "air-time". To keep costs low, the shoe does not use an Access Protocol (i.e. it does not test to see if any other transmissions are in progress) and thus "collisions" will occur sometimes. The receiver must use a strategy which accepts some loss of valid messages, and the overall performance, such as the display update rate of the Wrist Unit, should "gently degrade" as the number of Shoes sharing the transmission channel increases.

The loss of single messages is not particularly significant because the receiver software can use a strategy to "bridge" a lost message and a single missing update of the Wrist Unit display is unlikely to be noticed. However, if a significant number of consecutive messages are lost, then it will become apparent to the user, and ultimately the small timing errors in the message spacing will accumulate to the point where the Wrist Unit controller may "lose" the transmissions from its Shoe.

Using the scheme outlined above, and for the case of 20 shoes operating together, there is about a 1 in 3 chance that any specific message will have a collision, and about 1 in 9 that two will occur consecutively. A run of 8 consecutive collisions for a particular shoe would thus occur about once in $3^8$ or 1 in 6561, however each shoe sends about 4000 separate messages every hour, so a run of 8 collisions may occur about every 1½ hours, in these very "dense" operating conditions.

The data sent essentially comprises speed data, for which an 8 bit data byte is transmitted. There is also a benefit in implementing a flag to indicate whether the user is running or walking. This flag might be allocated to one of the "optional" flag locations at the end of some of the messages, or it might use one of the bit positions within the Speed byte.

The 'Speed' Data will not be more accurate than say 1%, so there is no need to transmit the data to better than this resolution. However, the actual speed may be less than 10 km/hr. (jogging) to more than 30 km/hr. (sprinting). Walking will be slower, but might be handled by using a different scale selected by the 'walking' flag. A "logarithmic" scale can maintain accuracy whilst limiting the number of data bits, and a 'piece-wise linear' scale can be simple to compute.

The Address is used to ensure that the Wrist Unit receives messages from the correct shoe. Since the shoe does not have a receiver to determine what Addresses may be in use by other shoes in the neighborhood, sufficient addresses must be allocated to ensure that there is a low risk of two Shoes having the same Address. One solution is to allocate a different Address to every Shoe, but this can only be done on the production line and requires the use of a One Time Programmable memory in the Shoe's microcontroller. Also, if a large number of shoes is manufactured then a high number of bits would need to be transmitted within the protocol.

If it is not practical to store the Address in OTP memory (e.g. because a masked-ROM processor is being used), then a "random" number can be generated by the microcontroller when its battery is first inserted. In either case, the Wrist Unit generally will be arranged to "learn" the address of its Shoe in the "Enrolment" process, when there are no other operational Shoes within RF range.

The DISTANCE data is not intended to provide "instantaneous" Distance readings for the Wrist Unit (which it can calculate for itself from Speed and Time data). However, it gives an accumulated distance for longer-term verification, for example when a large number of Speed values have not been received across the transmission link. Since a complete data frame will take at least 10 seconds (three blocks of 4 messages, each message spaced at least 0.75 s apart) to be transmitted serially, there is little point in resolving to better than 100 metres. With a Least Significant Bit of 100 meters, 12 bits can represent up to about 400 km, which should be sufficient for any running or walking session. However, when the Shoe is stationary, there is some justification for sending more precise data at both ends of the Distance Data word. Four bits at the "low" end would resolve to about 6 meters, which might be relevant for short bursts of activity (e.g. sprinting). Another nibble at the "high" end would extend the range to about 6500 km. Which perhaps represents a potential running range over the typical battery life of the transmitter, rather like the "Odometer" in a car.

A "Low Battery" flag may be allocated to one of the "optional" flag positions at the end of some of the data messages. It can be verified over a period of time, so does not need error protection. A further advantage of it being located at the end of the message and "active high" (i.e. '1' means low battery) is that with OOK modulation the "normal" condition (i.e. "good battery") gives a slightly shorter message length.

When the Wrist Unit is "started up" for an activity session, it must lock onto the transmissions from the shoe. The general priority of actions is:

1. Find the Run-in and Framing pattern of any shoe signal, and read the data;
2. Identify the time delay to the next transmission;
3. Check (part of) the shoe's address (if present) and search for another shoe if incorrect;
4. Continue to receive blocks of data until all are available or until any part of the Address is found to be wrong.

If the Shoe is transmitting the "Static" message format (i.e. when it does not contain speed data) then the "long Run-in" first message contains enough data to proceed with the Acquisition process even if some subsequent messages are "lost", for example due to collisions with other transmissions. The 4-bit address contained in this message also allows about 94% of the transmissions from incorrect Shoes to be rejected instantly. To complete the Acquisition process, the receiver then needs to receive at least one each of the 3 other types of message. However, further messages may be beneficial to fully verify the data, for example if errors are suspected, or the (Distance) data is different to that currently stored in the Wrist Unit.

If the Shoe is transmitting the "Moving" message format, then there is only sufficient "housekeeping" data just to identify the time gap to the next message, and if this second message is not found (which completes the FSR code) then the Acquisition process must be re-started. This is unfortunate if a collision occurs, but because the time delay carried in the long Run-in message may be "scrambled" (XORed with 4-bits of the Shoe's Address), about 94% of "incorrect" transmissions can be automatically rejected at this stage. If the message after the long Run-in message is received successfully, then all the FSR contents are known so the FSR can be shifted to the next state. This gives the Wrist Unit sufficient timing information to proceed with the acquisition, even if some messages are then lost. However, it must successfully receive at least one each of the 12 types of message block before fully updated data from the Shoe is confirmed.

Re-acquisition after an interrupted transmission sequence differs from full Acquisition because the present contents of the Feedback Shift Register are still calculable. This should be possible until the time references in the Shoe and Wrist Unit have drifted apart by about half a second, which should not occur for at least one or two hours. Thus it is desirable for the microcontrollers in both units continue to calculate the FSR value in a "background" mode for this length of time, even when the transmitter or receiver is nominally "switched off" (automatically, or by the user).

Depending on the elapsed time the Wrist Unit will need to power up the receiver for a wider "window", either a continuous burst, or in brief "snapshots" moving further away from the expected timing position.

In the same way as for the full Acquisition process, the Wrist Unit controller searches for long Run-in messages. However, even if the Shoe is transmitting the "Moving" message format, the receiver is still able to immediately reject about 94% of messages from "wrong" Shoes, because the 4-bits of the expected FSR contents are known. For the case of the "Static" transmission format, the expected state of all 12 bits is known, so almost all incorrect transmissions can be rejected immediately. Thus Re-acquisition can be more rapid and resistant to lost messages than full Acquisition, particularly when the Shoe is already in the "Moving" mode.

It is important that the Wrist Unit "Enrolls" onto the correct Shoe, and so a special message format to support this may be advantageous. However, the Wrist Unit will generally only be able to "Enroll" to a Shoe which is transmitting the "Static" message format (so that all address data can be read from one message), because the receiver needs to already "know" the low nibble of its Address field to "unscramble" the FSR contents to be able to calculate the time delay to the next message.

Before the serial data-bits can be received accurately, the Program Code must synchronise itself to the bit-transitions (using the Run-in and Framing Patterns) so that it "reads" the signal level ('0' or '1') near to the centre of each bit-position. In principle, this is done by using a Program Loop to wait until the carrier signal starts (e.g. for a logic Level '1') and then the subsequent Program Code adds or skips instruction-cycles, depending on when the Framing transitions occur.

Using (untrimmed) watch crystals, the time references in the Shoe and Wrist Unit should be consistent to better than 100 ppm or 0.01%. It may also be practical for the Wrist Unit software to calibrate its own time reference to that of the Shoe to even better accuracy during the Acquisition process. After a one second gap between two messages the framing pulse should be within 100 μs, or about ¼ of a bit-period. Thus the reception of every message potentially needs to be re-timed to the edges of the framing pulse, but up to 5 or 10 messages could be lost before there is a risk that other data will be confused with the framing pulse. However, the position of the expected framing position for subsequent messages should not be updated until the whole message has been validated, because a collision with a message from another Shoe could create a false Framing pulse.

After about 10 missing messages, there is a risk that part of the data may be confused with the Framing pulse, so it may be beneficial to restrict the search to messages with a long Run-in. This also helps to conserve battery power when the RF receiver "on window" is being increased in time. The maximum time before a full Re-acquisition process has to commence depends on the maximum continuous time that the RF receiver is to be operated, but if this is say 20 ms, then re-acquisition may have to commence after about 1 minute of finding no valid messages.

Figure 4:
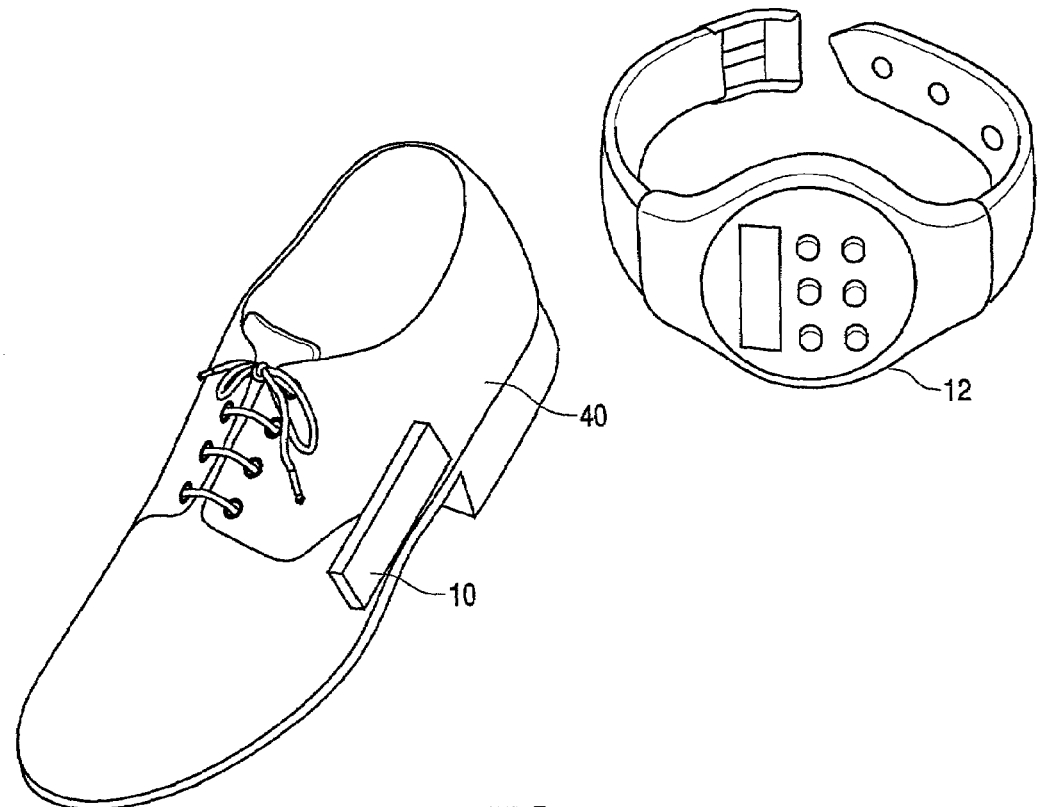
FIG. 4 shows a jogging shoe system using the transmission system of the invention.

FIG. 4 shows a shoe 40 provided with a transmitter 10, arranged on a side wall of the shoe and parallel to the sole of the shoe. The transmitter includes an accelerometer which measures the horizontal component of the acceleration to which the unit is subjected. This data is integrated by the processor 14 to generate the speed data, and further integrated to provide distance data, for transmission to the receiver 12. The receiver 12 is in the form of a wrist-mounted display.

The invention has been described in detail with reference to one particular application. However, the underlying principles may be applied equally to any data transmission system for use in applications where short but frequent data pulses are to be transmitted with low power consumption.

One specific implementation has been described in detail. However, various parameters can be changed, and this will be apparent to those skilled in the art. For example, there are various techniques for generating pseudo random sequences, and different degrees of randomness will be appropriate in different circumstances. A watch crystal has been selected as a low cost timing unit, although other known timing circuits may also be used.

The invention claimed is:

1. A data transmission system, comprising a transmitter and a receiver, wherein the transmitter is arranged to send data bursts with a low duty cycle at transmission timing points, the transmitter comprising a pseudo-random signal generator which governs the time delay between successive timing points and a local oscillator which controls the time of data transmission, and wherein the receiver comprises a corresponding pseudo-random signal generator and local oscillator, and wherein power is applied to the receiver substantially only corresponding in time to the timing of the data bursts, wherein at least one of the data bursts includes data that is utilized by the pseudo-random signal generator of the receiver to synchronize the pseudo-random signal generator of the receiver to the pseudo-random signal generator of the transmitter.

2. A system as claimed in claim 1, wherein the transmitter is arranged to send data bursts with a duty cycle of less than 1%.

3. A system as claimed in claim 1, wherein the transmitter and receiver each include a power source comprising a non-rechargeable battery.

4. A system as claimed in claim 1, wherein each pseudo-random signal generator comprises a maximal length feedback shift register, and where the data comprises data bits that are utilized to update a sequence of each maximal length feedback shift register.

5. A system as claimed in claim 1, wherein each data burst comprises a header section and a data section, and wherein the header section for a sub-set of the data bursts comprises a sequence which is unique compared to the header section and data section of the data bursts other than the sub-set of the data bursts, thereby to enable the receiver to obtain bit timing information.

6. A system as claimed in claim 5, wherein the header comprises address data which identifies the transmitter to the receiver.

7. A system as claimed in claim 6, wherein the address data is used in combination with a current output from the pseudo-random signal generator of the transmitter to generate a modified pseudo random sequence output by each of the pseudo-random signal generators.

8. A system as claimed in claim 5, wherein the unique header comprises an additional bit of data compared to the header section of the data bursts other than the sub-set of the data bursts.

9. A system as claimed in claim 5, wherein the unique header comprises a repeating sequence that is unique.

10. A system as claimed in claim 9, wherein the repeating sequence is a repeating sequence of a single digit.

11. A system as claimed in claim 1, wherein each data burst comprises a header section and a data section, and wherein the header section for a sub-set of the data bursts comprises the data that modifies a sequence of the pseudo-random signal generator of the receiver and thereby, modifies a time period to the next message.

12. A system as claimed in claim 11, wherein the header comprises address data which identifies the transmitter to the receiver.

13. A system as claimed in claim 12, wherein the address data is used in combination with the pseudo-random signal generator to generate a modified pseudo random sequence.

14. A system as claimed in claim 1, wherein the transmitter is for attachment to a shoe, and comprises an accelerometer and a processing unit, the processing unit integrating the detected acceleration over time to obtain instantaneous speed values which are transmitted in the data bursts.

15. A system as claimed in claim 14, wherein the receiver is for wearing on the wrist of the user of the system.

16. A system as claimed in claim 1, wherein each local oscillator comprises a 32768 Hz quartz oscillator.

17. A system as claimed in claim 1, wherein each data burst comprises a header section and a data section, and wherein the data section is an encoded data section.

18. A system as claimed in claim 17, wherein the encoded data is compared at the receiver to data bit patterns that are potentially valid for error trapping.

19. A system as claimed in claim 1, wherein the data bursts comprises speed data and distance data related to a transported speed and distance of the transmitter.

20. A system as claimed in claim 19, wherein the data bursts are transmitted in one of two modes, a first mode is a static mode wherein housekeeping data is transmitted and speed data is not transmitted and a second mode is a moving mode wherein the speed and distance data is transmitted.

* * * * *